United States Patent Office 3,367,918
Patented Feb. 6, 1968

3,367,918
POLYMERIC AMIDE-SECONDARY DIALKYL AMMONIUM SALT-PARAFORMALDEHYDE FLOCCULANT COMPOSITION AND METHOD
Chester A. Lesinski, Bay City, and Joseph W. Van Wyk, Midland, Mich., assignors to The Dow Chemical Company, Midland, Mich., a corporation of Delaware
No Drawing. Filed Aug. 4, 1964, Ser. No. 387,477
6 Claims. (Cl. 260—72)

ABSTRACT OF THE DISCLOSURE

A free flowing solids admixture of a water-soluble polymeric amide flocculant, a solid, water-soluble secondary dialkylammonium salt and paraformaldehyde forms a highly useful cationic flocculant in water solution.

The present invention relates generally to the flocculation field and more particularly to a novel flocculant composition and method.

It is known that water-soluble polymeric amide flocculants can be converted to strongly cationic materials by the reaction thereof with an aldehyde and an amine. The general reaction is taught by Grimm et al. in U.S. Patent 2,328,901, and also by Schiller et al., in an article entitled "Ionic Derivatives of Polyacrylamide," Ind. Eng. Chem. 49, 2132 (1956). From a consideration of these references, the reaction has apparently been practiced as a stage wise reaction of the three ingredients in an aqueous medium with heating of the reaction system during at least one of the reaction stages.

While the modified polymers of these references were improved cationic flocculants, the modified product could not be readily separated from the aqueous medium in which it was formed without loss of significant flocculation activity. As a consequence it was necessary for the manufacturer of the polymeric amide flocculant to ship the modified polymer as a dilute aqueous solution, thereby increasing transportation costs, or else induce the user of the polymeric amide flocculants to carry out the modifying reaction in its plant. Neither of these alternatives are very attractive and thus this technology has laid substantially fallow.

It is an object of the present invention to provide a novel composition which forms cationic flocculants from polymeric amides. A particular object is to provide a solid composition, which forms cationic derivatives of flocculant polymeric amides upon dissolution in an aqueous medium, but which, in the solid state, remains as a substantially free-flowing solid. These and other objects, as will become apparent hereinafter are accomplished in the present invention.

In accordance with this invention, it has now been discovered that certain secondary amine salts and para-formaldehyde can be mixed with polymeric amide flocculants to provide a free-flowing solid composition, which forms a soluble cationic derivative of the polymeric amide, when dissolved in an aqueous solvent medium at a suitable pH.

From about 0.1 to about 1 mole of the aldehyde and from about 0.1 to about 1 mole of the amine respectively are employed for each amide chemical equivalent in the polymeric amide. Preferably, the moles of amine used should be approximately equal to the moles of aldehyde used. The language "amide chemical equivalent" has reference herein to the moles of amide containing monomer, divided by the amide functionality of the monomer which are interpolymerized in the polymeric amide flocculant.

In a distinct embodiment of the invention, the amine salt and aldehyde are first reacted in and recovered from an aqueous solvent to form a solid water-soluble product. This solid reaction product is then mixed with the polymeric amide in proportions of about 0.1 up to about 1 mole thereof per amide chemical equivalent. The resulting composition likewise provides a free-flowing solid admixture, stable in the solid state, but reactive when dissolved in water at a suitable pH to provide a cationic polymeric amide flocculant.

Since no heating is required for the above solid mixtures to react in aqueous solution, the temperature of the aqueous solvent medium may be that of convenience. For example, the temperature of the aqueous solvent medium is conveniently the temperature of the water employed to make up stock solutions of the flocculant. A suitable pH for the conversion of the non-ionic amide to the desired cationic form is at least about 9.5. As a general rule the pH controlling materials present in the solvent medium should not constitute more than about 20 percent by weight of the aqueous system. The desired pH can be achieved by the addition to the system of alkali metal hydroxides or buffering agents such as alkali metal phosphates, carbonates or borates. While the reaction is complete to an effective degree within a few minutes after dissolution of the solid polymer composition, best results are achieved if the solution is reacted for about 15 minutes prior to use, preferably with mild agitation thereof as by stirring or shaking. Optimum conversions are obtained by allowing the solution to react for at least about 2 hours before use.

Amines that can be employed successfully as solid state additaments to the polymeric amide flocculants include the water-soluble, inorganic and organic acid salts, having melting points above about 35° C., of secondary dialkyl amines wherein the alkyl groups contain from 1 to 2 carbons. Illustrative of such amines are dimethylammonium chloride, dimethylammonium bromide, dimethylammonium sulfate, diethylammonium chloride, methylethylammonium chloride, dimethylammonium borate, diethylammonium acetate, dimethylammonium oxalate, dimethyl ammonium benzoate, diethylammonium formate, dimethlyammonium succinate. The polymeric amide flocculant used herein can be generally characterized as a high molecular weight, essentially linear and water-soluble polyalkane, i.e., polymerized from monoethylenically unsaturated monomers, containing a plurality of substituent amide groups. A 0.5 percent by weight solution of a flocculant grade polymeric amide in an aqueous 4 percent NaCl solution, at a pH of 7, should have a viscosity of at least 4 centipoises as measured with an Ostwald viscosimeter.

Specific polymeric amide flocculants, to which the invention is applicable, are high molecular weight homopolymers and copolymers of acrylamide, methacrylamide, N-isopropyl acrylamide, amides of fumaric and maleic acids, crotonamide, and the like monoethylenically unsaturated water-soluble amides. Illustrative of such homopolymers are the polyacrylamides which may have up to 40 percent, or so, of their carboxamide groups hydrolyzed to carboxylate groups. Copolymers of the amide monomers are prepared by copolymerizing them with up to 50 mole percent of other monoethylenically unsaturated, water-soluble monomers such as acrylic acid, methacrylic acid, styrene sulfonic acid, vinylbenzoic acid, maleic acid and alkali metal and ammonium salts foregoing acids, Other suitable water-soluble comonomers are acrylonitrile, methacrylonitrile, allylalcohol, N-vinylpyrrolidone, N-vinyl-5-methyl oxazolidone N-vinylpyridine, vinylbenzyl-quaternary ammonium compounds (vinylbenzyl quaternary ammonium chloride) and 2-aminoethylacrylate. Still other comonomers that can be employed in polymeric amide flocculants in minor proportions, so as not to destroy the overall water solubility of the resulting copolymer, are such water-insoluble, monomers as styrene, alphamethylstyrene, vinylacetate, vinylchloride, vinylformate, vinylalkyl ethers, alkylacrylates and akylmethacrylates. To ensure water solubility, such copolymers should not contain more than about 25 mole percent of the water-insoluble monomers.

When employing the solid polymer composition of the invention, it is dissolved in an aqueous medium to provide from about 0.01 up to as much as about 20 percent by weight dissolved solids (the upper limit on the amount dissolved is controlled by the viscosity which limits practical mixing). The pH of the solution is adjusted to at least about 9.5, preferably at least about 11, and time is allowed to effect the desired conversion of the polymeric amide to a cationic derivative thereof. Subsequently, the converted polymer solution is employed as would be any stock solution of a polymeric fluocculant. That is, the aqueous solution of the reacted polymer is added to the suspension to be flocculated in amount effective to produce coagulation and separation of the suspended phase. Preferably the addition of the polymeric flocculant to the suspension is effected rapidly with initial turbulent agitation diminishing to gently stirring of the treated suspension to promote floc formation.

Aqueous suspensions on which the modified polymeric flocculant of the invention is most effective, include those which contain in the suspended phase clay, silica, coal-fines, organic matter, and/or polysaccharides such as cellulose fibers. The pH of the suspension may range from strongly acidic to strongly basic.

Generally, separation of the coagulated solids will be allowed to take place by settling of the flocs which are ultimately removed from the settler as an underflow stream. Separation may also be accomplished by filtration, centrifugation and/or floatation techniques.

As a specific embodiment of the invention, a dry free-flowing blend of solids was prepared from 1 part by weight of a flocculant grade of polyacrylamide having less than 1 percent of its amide groups hydrolyzed, 1.29 parts by weight of dimethylammonium oxalate, 0.42 part by weight of para-formaldehyde and 2.6 parts by weight of sodium carbonate. When dissolved in water the foregoing blend of solids reacted to provide a solution of N(dimethylaminomethyl) acrylamide polymer. This particular blend required about 1 hour to achieve complete solution of all ingredients. The system was stirred several additional hours to promote optimum conversion of the polymer.

The reacted polymer solution was further diluted to about 0.10 percent by weight solids to provide an efficient applicating solution of the converted polymeric amide flocculant. This solution was applied to an aqueous dispersion of starch, containing 5 percent dispersed starch solids, under flocculating conditions. The resulting rate of flocculation, that is, floc build up and settling thereof measured as the rate of the depression of the interface between the clear supernatant and underlying floc suspension was at least about 2 inches per minute. The equivalent dose of the starting polyacrylamide does not flocculate the suspension.

What is claimed is:

1. A composition of matter comprising a free-flowing solid of a water-soluble, polymeric carboxylic acid amide flocculant polymerized from monoethylenically unsaturated monomers and from about 0.1 up to about 1 mole, per amide chemical equivalent of a solid, water-soluble secondary dialkylammonium salt wherein the alkyl group contains from 1 to 2 carbons and from about 0.1 up to about 1 mole, per amide chemical equivalent of formaldehyde in the form of para-formaldehyde.

2. A composition of matter comprising a free-flowing solid admixture of a water-soluble, polyacrylamide and from about 0.1 up to about 1 mole, per amide chemical equivalent, of a solid, water-soluble, secondary dialkyl ammonium salt wherein the alkyl group contains from 1 to 2 carbons and from about 0.1 up to about 1 mole, per amide chemical equivalent, of formaldehyde in the form of paraformaldehyde.

3. A composition of matter comprising a free-flowing solid admixture of a water-soluble, polymeric carboxylic acid amide flocculant polymerized from monoethylenically unsaturated monomers and from about 0.1 up to about 1 mole per amide chemical equivalent of a solid reaction product of a water-soluble, secondary dialkyl ammonium salt wherein the alkyl group contains from 1 to 2 carbons and formaldehyde in the form of para-formaldehyde, the amine and formaldehyde being reacted on a 1 to 1 molar basis.

4. A method for flocculating a suspension of finely divided solids amenable to flocculation with cationic flocculants, which comprises dissolving the composition of claim 1 in water at a pH of at least about 9.5 in an amount sufficient to provide a solids concentration within the range from about 0.01 up to about 20 percent by weight of the solution and after agitating the resulting solution for at least about 15 minutes, applying the resulting cationic polymer in the form of an aqueous solution to the suspension to effect flocculation of the suspended solids.

5. A method for flocculating a suspension of finely divided solids amenable to flocculation with cationic flocculants which method comprises; dissolving in water at a pH of at least about 9.5 a solid admixture consisting of a polyacrylamide and from about 0.1 up to about 1 mole per amide chemical equivalent of a solid, water-soluble, secondary dialkyl ammonium salt, wherein the alkyl group contains from 1 to 2 carbons and from about 0.1 up to about 1 mole, per amide chemical equivalent, of formaldehyde in the form of para-formaldehyde, said admixture being dissolved in water to provide a solids concentration in the range from about 0.01 up to about 20 percent by weight of the solution, agitating the resulting solution for at least about 15 minutes, and applying the resulting cationic polymer in the form of an aqueous solution in the suspension to effect flocculation of the suspended solids.

6. A method as in claim 5 wherein the polyacrylamide is characterized by a high molecular weight such that a 0.5 percent by weight solution thereof in an aqueous 4 percent sodium chloride solution, at a pH of 7, has a viscosity of at least 4 centipoises as measured with an Ostwald viscosimeter.

References Cited

UNITED STATES PATENTS 2,328,901  9/1943  Grimm et al. _____ 260—72

WILLIAM H. SHORT, *Primary Examiner.*

SAMUEL H. BLECH, *Examiner.*

E. M. WOODBERRY, *Assistant Examiner.*